Jan. 12, 1932.        C. E. BRE MILLER        1,840,560
GRADING MACHINE
Filed Oct. 28, 1927        2 Sheets-Sheet 1

INVENTOR
C.E.BreMiller
BY
Philip E. Siggers,
ATTORNEY

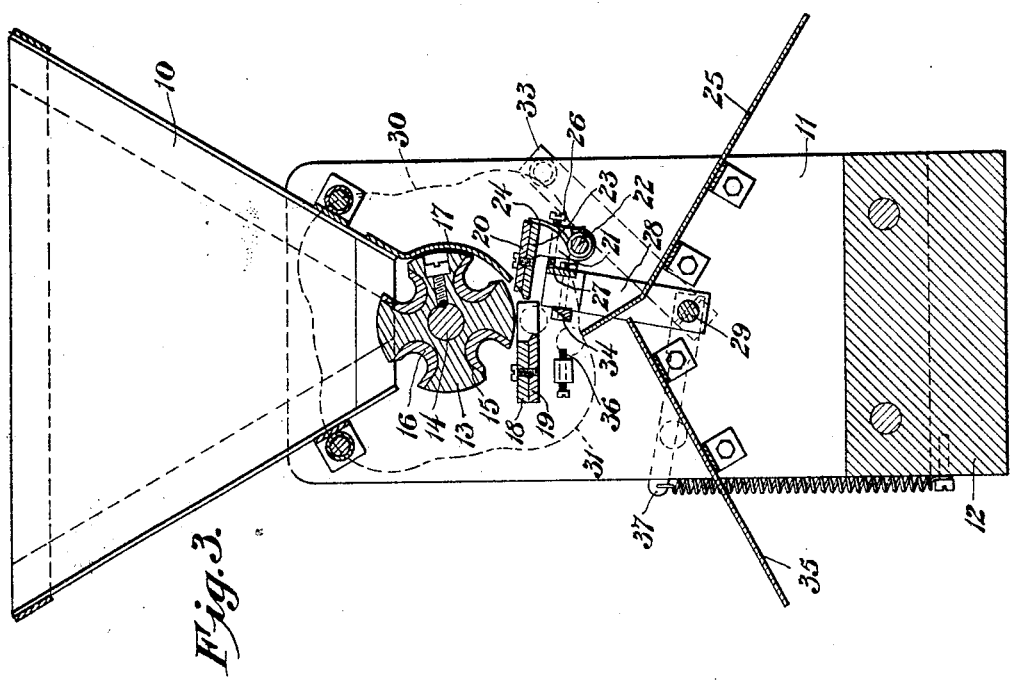
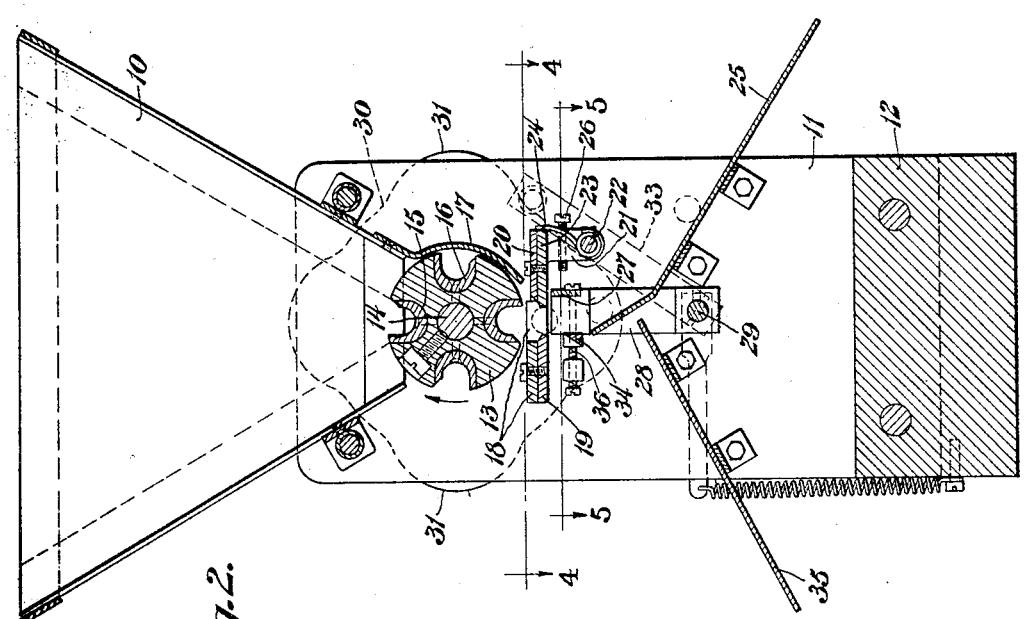

Patented Jan. 12, 1932

1,840,560

UNITED STATES PATENT OFFICE

CLIFFORD E. BRE MILLER, OF CHICAGO, ILLINOIS, ASSIGNOR TO COOK LABORATORIES, INC., OF CHICAGO, ILLINOIS, A CORPORATION OF DELAWARE

GRADING MACHINE

Application filed October 23, 1927. Serial No. 229,381.

This invention relates to grading machines and aims among other objects to provide a machine of this character which will automatically grade glass tubes and the like according to their external diameter.

In the drawings, showing a preferred embodiment of the invention:

Fig. 2 is a vertical sectional view taken on the line 2—2 of Fig. 1;

Fig. 3 is a similar view showing the movable parts in a different position;

Figure 1:
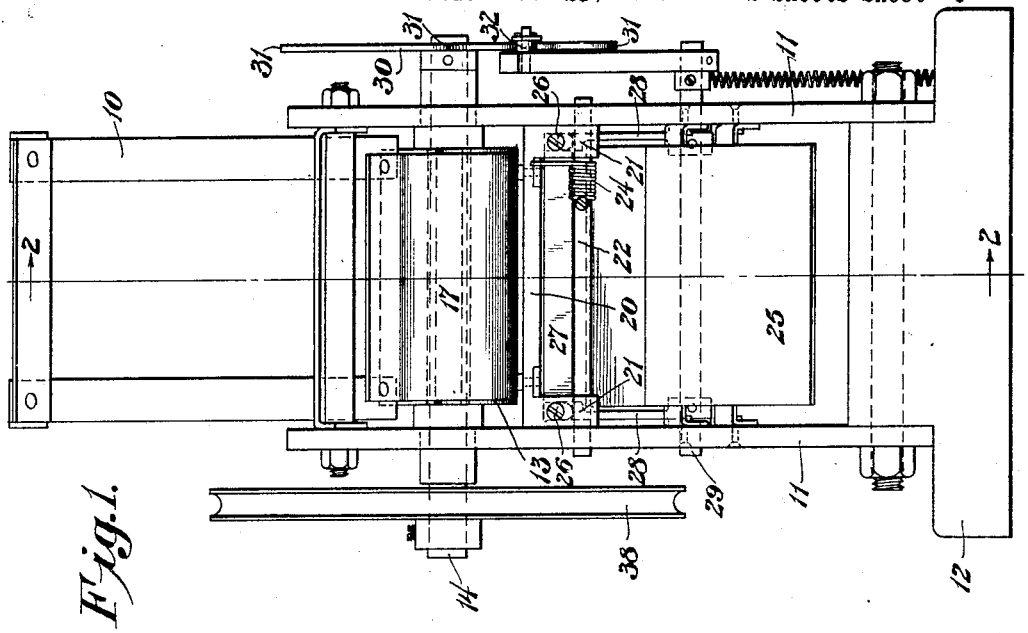
Fig. 1 is a front elevation.

In the manufacture of the tubular glass bodies of medicament dispensing cartridges for hypodermic and other syringes, because of the inevitable variation in diameter of glass tubing, it is necessary that the tubes be gauged and classified according to their external diameter, otherwise some of the cartridges, after manufacture, may be so large that they cannot be inserted in the syringes (which are of a standard size), and hence cannot be used as dispensing containers. The present invention provides an automatic machine for segregating the tubes which are too large from the tubes which may be used with the syringes.

The machine shown comprises generally a hopper; feeding mechanism to deliver the tubes from the hopper to a gauging device through which tubes of a given diameter will pass to a chute leading out of one side of the machine; and mechanism for opening the gauging device and deflecting tubes whose diameter is too large to another chute leading from the other side of the machine.

Herein the hopper 10 is suitably mounted between side plates 11, secured to a base 12. The tubes to be graded are placed in the hopper and are automatically fed from its open bottom by a power-driven distributor. In the present example, the distributor comprises a cylinder 13, secured to a rotatable shaft 14 mounted in bearings provided on the side plates 11. A plurality of longitudinal grooves or slots 15 are provided in the periphery of the cylinder and in each slot a semi-cylindrical tube-carrying insert 16 is removably secured. This construction permits the use of one machine for the grading of tubes of larger or smaller diameters by replacing the inserts 16 with other inserts of proper size. A guard plate 17, which may be secured to the hopper 10, extends partly around the cylinder 13 and insures the delivery of the tubes in the proper position to the gauging device located beneath the distributor.

Figures 4, 5:
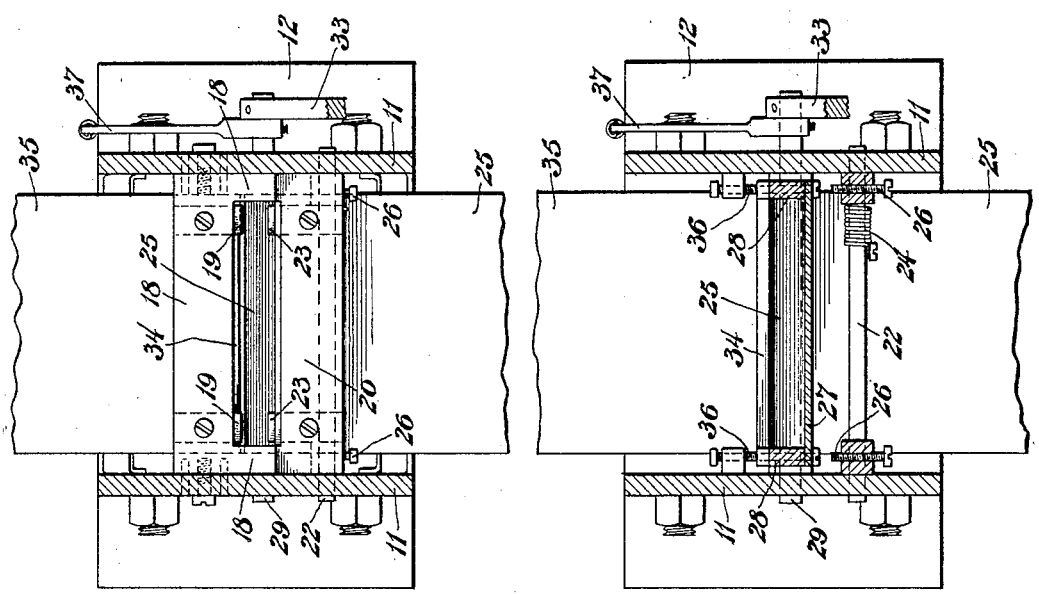
Fig. 4 is a horizontal sectional view taken on the line 4—4 of Fig. 2.
Fig. 5 is a horizontal sectional view taken on the line 5—5 of Fig. 2.

Herein the gauging device is made in two sections; one stationary and the other movable. The stationary section of the gauge may be formed of a substantially U-shaped plate 18 (Figs. 2 and 4) rigidly secured between the side plates 11 by screws and dowel pins or the like and having gauge strips 19 removably secured near each end. The movable section may be made in the form of a substantially rectangular plate 20 having depending supporting legs 21 (Figs. 2 and 3) pivotally mounted on a rod 22 rigidly secured in the side plates 11. Gauge strips 23 are removably secured on the plate 20 opposite to the strips 19, as best shown in Fig. 4. The inner edges of the opposed strips 19, 23 are adapted to be held spaced apart normally a distance equal to the desired maximum outside diameter of the tubes, by a spring 24 or the like holding the movable section against the ends of side arms of the stationary U-shaped plate 18.

A tube of a diameter equal to, or less than, the normal distance between the inner ends of the opposed strips 19 and 23, will drop between them and onto an inclined chute 25 having its upper edge extending across the opening in the gauge and its lower surface extending out one side of the machine. See Fig. 2. A tube larger than the desired maximum diameter will be held by said strips until released by a tripping mechanism, about to be described, engaging adjustable stops 26 on the legs 21.

Herein the tripping mechanism comprises a strike plate 27 (Figs. 2 and 3) secured to upright arms 28 and adapted to engage stops 26 to move plate 20 away from plate 18. The arms 28 are rigidly mounted on a rock shaft 29 carried by the side plates 11. To rock the shaft 29 and thereby open the gauge, a cam disc 30, which is secured to the rotatable shaft 14, is provided with cam portions 31 adapted to engage a roller 32 (Fig. 1) mounted on an arm 33 secured to the shaft 29. When the gauge is open, a deflector bar 34 secured to the arms 28 directs the tubes whose diameter is too large across the top of the chute 25 and onto a chute 35 (see Fig. 3). Adjustable stops 36 are provided, against which the arms 28 are adapted to rest when they are returned to their normal position by a spring retracted arm 37 rigidly supported on the rock shaft 29. The machine may be operated by manually turning the shaft 14, or any suitable source of motive power may be connected to a pulley wheel 38 (Fig. 1) secured to the shaft 14.

In the operation of the device, the hopper 10 is filled with tubes to be graded, and as the distributor rotates, the tubes will be delivered individually to the gauge. At the time of delivery to the gauge the various parts of the machine will be in the position shown in Fig. 2. If the tube is at or below the critical diameter, it will instantly pass through the gauge to the chute 25. If the tube be of too large a diameter it will be held between the inner ends of the strips 19 and 23, until one of the cam portions 31, on the disc 30, by engaging the roller 32 on the arm 33, rocks the shaft 29, moving the strike plate 27 into engagement with the stops 26, thereby opening the gauge and permitting the tube to fall downwardly and strike the deflector bar 34, which directs the tube to the chute 35. As the disc rotates further, the parts will return to their normal position before the next tube is delivered to the gauge.

By adjusting the stops 26 and 36 and replacing the inserts 16 and the gauge strips 19 and 23 with others of required sizes, tubes of various diameters may be graded.

From the foregoing description and a study of the drawings, it will be apparent that a grading machine of simple construction has been provided which will automatically and rapidly grade tubular bodies according to their outside diameters, and which is highly selective and will grade tubes accurately although varying in outside diameter by no more than a fraction of a millimeter.

Obviously the present invention is not restricted to the particular embodiment thereof herein shown and described. Moreover, it is not indispensable that all the features of the invention be used conjointly, since they may be employed advantageously in various combinations and subcombinations.

What I claim is:—

1. A grading machine for tubes and the like comprising, in combination, a stationary gauge member; a pivoted gauge member; means for holding the pivoted gauge member a given distance from the stationary gauge member to permit tubes of a given diameter to pass therebetween; a chute for the tubes of the given diameter; means for moving the pivoted gauge member from the stationary gauge member to permit tubes of a larger diameter to pass therebetween; a second chute for the larger tubes; and means for directing the larger tubes onto the second chute.

2. A machine for grading glass tubes and the like comprising, in combination, a gauge set to pass tubes of a certain diameter and sufficiently closed to stop tubes of a greater diameter; means for feeding the tubes individually to the gauge; means for opening the gauge to pass the tubes of large diameter and means for deflecting the tubes in one direction or another according as to whether they are oversize or not.

3. A machine for grading glass tubes and the like comprising, in combination, tube-feeding means; a gauge normally set to pass a tube of a predetermined diameter or less; means for opening the gauge after a tube has an opportunity to pass, thus passing tubes of larger diameter; and means to deflect the larger tubes to traverse a different path when the gauge is open for them.

4. A machine for grading glass tubes and the like comprising, in combination, a hopper; a gauge normally set to pass tubes of a given diameter; a chute for receiving such tubes; means for feeding the tubes individually to the gauge; means associated with the feeding means to open the gauge to pass tubes of a larger diameter; a chute for the larger tubes; and means to deflect the larger tubes to their chute when the gauge is open for them.

5. A machine for grading glass tubes and the like comprising, in combination, a hopper; feeding means beneath the hopper; a gage having a movable member and located beneath the feeding means, said gage adapted to pass through it tubes of standard and less than standard diameter but to temporarily detain tubes of greater than standard diameter; and tripping means for moving the movable member of the gage to pass the temporarily detained tubes of larger diameter.

6. A machine for grading glass tubes and the like comprising, in combination, a hopper; a rotatable shaft; a longitudinally slotted cylinder on said shaft; cam means on the shaft; a gauge adapted to open and close; and means operable by said cam to open the gauge.

7. A grading machine for tubes comprising, in combination a gauging device; a tube carrier above the gauging device and having longitudinal slots therein; and tube-carrying inserts removably secured in the slots.

8. A grading machine for tubes comprising, in combination, a slotted cylinder; tube carrying inserts removably secured in the slots in the cylinder; a gauging device; and means associated with the cylinder to open the gauging device.

9. A grading machine comprising, in combination, a stationary gauge member; a movable gauge member; adjustable stops on the movable gauge member; a rock shaft; means to rock the shaft; arms secured to the rock shaft; and a strike plate associated with the arms and adapted to engage the adjustable stops to move the movable gauge member.

10. A grading machine comprising, in combination, a gauging device; means for feeding the tubes to the gauging device; a rock shaft; means associated with said shaft to open the gauge when the shaft is rocked; and means associated with the feeding means to rock the shaft.

11. A grading machine comprising, in combination, a stationary U-shaped plate; a movable plate; gauge elements removably secured to each plate; means to hold the movable plate in abutting relation with the stationary plate; a cam; and means operable by the cam to move the movable plate and deflect tubes which exceed a certain diameter.

12. A grading machine comprising, in combination, a gauging device adapted to open and close; a rock shaft; arms in said rock shaft; means associated with the arms to open the gauge when the shaft is rocked; a deflector on said arms adapted to deflect tubes above a maximum diameter; means for rocking the shaft; and means to close the gauge and return the arms to normal position.

13. A grading machine comprising, in combination, a gauging device adapted to open and close; a rock shaft; arms in said rock shaft; means associated with the arms to open the gauge when the shaft is rocked; a deflector on said arms adapted to deflect tubes above a maximum diameter; means for rocking the shaft; means to close the gauge and return the arms to normal position; and adjustable stops to limit the movement of the arms when returning to normal position.

14. A grading machine comprising, in combination, a slotted cylinder; tube carrying inserts removably secured in the slots; a gauge constructed and arranged to open and close; a pivoted deflector below the gauge and inoperative for tubes of a given diameter; and means associated with the slotted cylinder to open the gauge and position the deflector to deflect tubes of a larger diameter.

15. A machine of the class described comprising, in combination, a gauging device so constructed and arranged as to stop any tube above a certain size; means for feeding tubes one at a time to the gauging device; and means for moving a part of the gauging device to pass through the gauging device tubes of the size which will be stopped by the gauging device.

16. A machine of the class described comprising, in combination, a gauging device so constructed and arranged as to stop any tube above a certain size; means for feeding tubes one at a time to the gauging device; and means for moving a part of the gauging device to pass through the gauging device tubes of the size which will be stopped by the gauging device; said gauge-opening device operating after the feeding means has fed a tube to the gauging device, so that tubes which are too large are momentarily detained.

17. A machine of the class described comprising, in combination, a gauging device so constructed and arranged as to stop any tube above a certain size; means for feeding tubes one at a time to the gauging device; and means for moving a part of the gauging device to pass tubes of the size which will be stopped by the gauging device; said gauge-opening device operating after the feeding means has fed a tube to the gauging device, so that tubes which are too large are momentarily detained; and deflecting means moving simultaneously with the gauge as it opens to divert to different paths the tubes of standard size or below from the tubes of greater than standard size.

18. A machine of the class described comprising, in combination, a gauging device so constructed and arranged as to stop any tube above a certain size; means for feeding tubes one at a time to the gauging device, said feeding means having removable members for receiving and discharging said tubes laterally, the removable members being of such interior diameter that the feeding means serves as a preliminary gauge, rejecting all tubes whose diameter at any point is greater than the interior diameter of the removable members; and means for moving a part of the gauging device to pass tubes of the size which will be stopped by the gauging device.

19. A grading machine for tubes and the like, comprising, in combination, a gauge having a movable member so constructed and arranged that it permits tubes of standard or less than standard diameter to pass but retains tubes of greater diameter; means for feeding the tubes to the gauge; means for operating the movable member of the gauge so as to pass through the gauge a tube which is above standard diameter, immediately after such a tube has come to rest on the gauge and before any other tubes have been fed to the gauge; and means to divert the tubes which are above standard diameter into a separate path after being so passed.

20. A grading machine comprising, in combination, a stationary gauge section; a movable gauge section; each section comprising a plate and gauge elements removably secured to said plate; said gauge elements being in spaced relation to each other; means for feeding tubes one by one into the space between the gauge elements; and tube deflecting means which changes position simultaneously with the relative movement of the gauge members, so as to aid in separate tubes of different diameters.

21. A grading machine comprising, in combination, a stationary plate; a pivoted plate spaced therefrom; power-actuated means for oscillating the pivoted plate; gauge elements removably secured to each plate; and means for feeding tubes one at a time into the space between said plates so as to pass by gravity between the opposed gauge elements.

In testimony, that I claim the foregoing as my own, I have hereto affixed my signature.

CLIFFORD E. BRE MILLER.